Aug. 27, 1935.  L. LEROY  2,012,884

REGULATING VAPOR ELECTRIC DISCHARGE RECTIFIER

Filed July 16, 1934   2 Sheets-Sheet 1

Inventor:-
Louis Leroy,
By- Smith, Michael & Gardiner,
Attorneys.

Patented Aug. 27, 1935

2,012,884

UNITED STATES PATENT OFFICE 2,012,884

REGULATING VAPOR ELECTRIC DISCHARGE RECTIFIER

Louis Leroy, Paris, France, assignor to Forges et Ateliers de Constructions Electriques de Jeumont, Société Anonyme, Paris, France, a French joint-stock company Application July 16, 1934, Serial No. 735,500
In France July 24, 1933

6 Claims. (Cl. 175—363)

This invention relates to vapor electric discharge devices employed as rectifiers and has for its primary object the automatic regulation of a rectifier of this type, provided with anode-control grids, so as to obtain any desired characteristic of the rectified voltage as a function of the load, or of the output current as a function of the D. C. power output, or again of the rectified current as a function of the current supplied by other machines coupled in parallel with the rectifier in question.

The invention also has for an object improved devices for the automatic regulation of rectifiers of the ionized vapor discharge type provided with anode control grids, these devices allowing of obtaining the compounding, over-compounding and under-compounding of the D. C. output voltage supplied by the rectifiers, and their operation at constant current, as well as parallel working of a rectifier of this type with other D. C. generators for example mechanical rectifiers or rotary converters, having any D. C. voltage characteristics.

It is already known to utilize a biasing voltage for the anode-control grids of vapor electric discharge rectifiers, constituted by an alternating voltage, which may be of the same frequency as the anode frequency, and upon which there is superposed a variable D. C. voltage. With the object of effecting an automatic regulation of the rectifier, I have proposed in my pending application No. 726,465 filed May 18, 1934 to employ a suitably controlled exciter having three field windings in order to furnish the D. C. voltage component for the grid bias.

According to the present invention, the grid biasing voltage is constituted by an alternating component, which may be of the same frequency as the anode frequency, and a variable D. C. component furnished by an exciter having two field windings, one of these windings being shunt wound and the other energized independently, but the exciter is utilized in a novel manner which allows a more general application of the control methods referred to above.

In order better to explain the invention, it will now be described with reference to the accompanying drawings, in which:

Figs. 2, 3 and 4 are diagrams hereafter referred to; and

Figure 1:
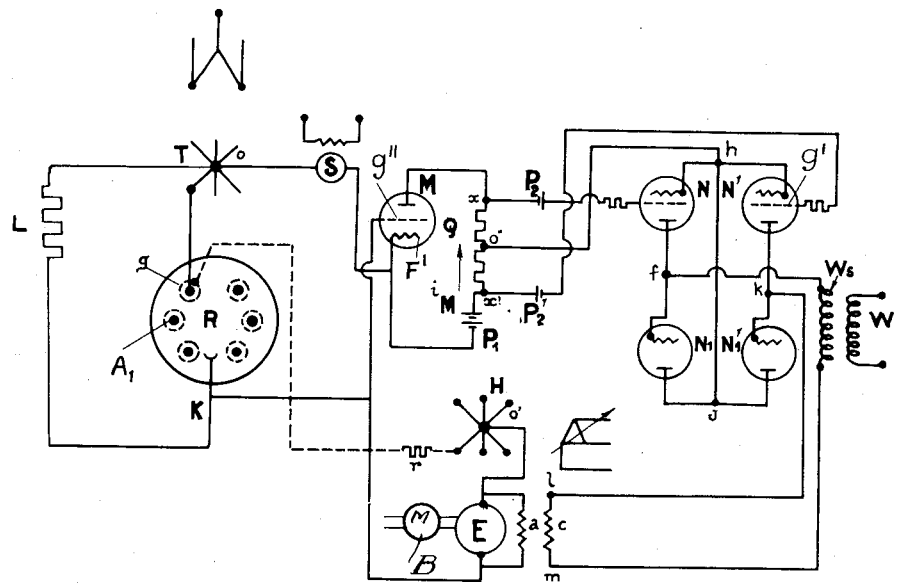
Fig. 1 represents by way of example a first arrangement for carrying out the present invention.

The arrangement shown in Fig. 1 comprises the following essential elements:

R.—Mercury vapor electric discharge rectifier provided with six anodes $A_1$ having control grids $g$;

T.—Transformer feeding six-phase current to the rectifier R;

L.—External load line fed by the rectifier R and connected to the neutral point of the transformer T;

H.—Six-phase phase-shifter connected to the control grids $g$ through protective resistances $r$;

E.—Exciter with two field windings $a$ and $c$, driven at constant speed by a motor B;

S.—D. C. generator having independent field excitation;

M.—Triode amplifying tube;

N and N'.—Ionized vapor discharge tubes provided with control grids $g'$;

$N_1$ and $N'_1$.—Ionized vapor discharge tubes without control grids;

W.—Transformer feeding the group of tubes N, N', $N_1$, $N'_1$; the primary of this transformer is fed by an independent source of A. C. current.

This arrangement has for its object to obtain for the transformer-rectifier group T R a well-defined voltage characteristic, for example such that the D. C. voltage Ec of the rectifier R shall be constant whatever be the D. C. output current Ic. The generator S is driven at constant speed and it furnishes a constant D. C. voltage Es, which is here used as the reference quantity in connection with the automatic regulation or control.

The filament or cathode F'' of the triode tube M is connected to the generator S and its grid $g''$ to the cathode K of the rectifier R. The filament-plate circuit of the tube M is closed upon a resistance Q through a constant D. C. source $P_1$; this amplifying tube M is employed in order to increase the precision of the regulation obtained by using the generator S as reference machine.

The tubes N, N', $N_1$, $N'_1$, are mounted as in a bridge, the cathodes of the tubes N and N' being of equal potential. The grid of the tube N is connected through a D. C. source $P_2$ to one extremity $x$ of the resistance Q. The grid of the tube N' is connected through a D. C. source $P'_2$ to the extremity $x'$ of the resistance Q. The middle point O'' of the resistance Q is connected to the cathodes of the tubes N and N'.

The exciter E is connected between the cathode K of the rectifier R and the neutral point O' of the phase-shifter H. Its independent winding $c$ is connected across the secondary winding $W_s$ of the transformer W by way of the bridge formed by the tubes N, N', $N_1$, $N'_1$. The voltage $E_s$ of the generator S acts in opposition to the output voltage $E_c$ of the rectifier R. The voltage difference ($E_s - E_c$) is applied between the grid and the filament of the triode amplifying tube M.

Figure 2:
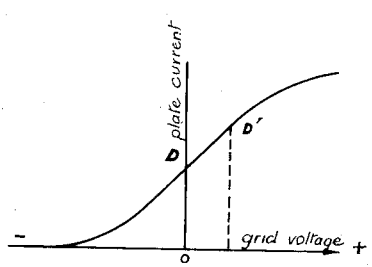

Fig. 2 represents the plate-current characteristic as a function of the grid-voltage in the tube M. When the grid-voltage is O, that is when the rectifier voltage $E_c$ is equal to the constant voltage $E_s$ of the reference machine S, the plate-current $i_M$ has the value OD. The grid-voltage of the tube N in relation to its cathode is represented by $eg_N$ which is equal to $e_{P2} - e_Q$, where $e_Q$ is the difference of potential between the points O'' and $x$ of the resistance Q, and $e_{P2}$ that at the terminals of the source $P_2$. The grid voltage of the tube N' in relation to its cathode is represented by $eg_{N'}$ which is equal to $e_Q - e_{P'2}$, where $e_Q$ is the difference of potential between the points O'' and $x'$ of the resistance Q, and $e_{P'2}$ that at the terminals of the source $P'_2$.

The values of the D. C. voltages $e_{P2}$ and $e_{P'2}$ are regulated in such a way that when $E_s = E_c$, the voltages $eg_N$ and $eg_{N'}$ shall be equal and both negative so that the tubes N and N' cannot discharge. In other words, the voltage $e_{P2}$ is less than the drop between O'' and $x$ when the current $i_M = OD$, and the voltage $e_{P'2}$ is greater than the drop between $x'$ and O'' under the same conditions; the two sources $P_2$ and $P'_2$ have opposite poles connected to the respective grids, as seen in Fig. 1, so that when the tube M is nonconductive and no current passes through the resistance Q (other than the grid currents caused by the sources $P_2$ and $P'_2$) the grid-potentials of the tubes N and N' will be of opposite sign, though not necessarily equal.

If $E_c$ is greater than $E_s$, the plate-current $i_M$ will tend to increase, for example to D' (Fig. 2), and consequently the voltage $e_Q$ will increase. The grid-voltage $eg_{N'}$ of the tube N' will diminish in negative value and may even take a positive value; on the contrary, the grid-potential $eg_N$ of the tube N will increase in negative value. The tube N' will therefore discharge and the current furnished by the secondary winding $W_s$ of the transformer W will flow in the direction $m\ l\ k\ h\ j\ f$, the independent field winding $c$ of the exciter E being traversed by a rectified current $i_c$ passing in the direction from $m$ to $l$.

If $E_c$ is less than $E_s$, the plate-current $i_M$ will tend to decrease from the value OD and it can easily be verified that the tube N will discharge and that therefore the field winding $c$ of the exciter E will be traversed by a rectified current $i_c$ flowing in the opposite direction, that is to say from $l$ to $m$.

The consequences of such a distribution of the current $i_c$ in the independent field winding $c$ of the exciter E are indicated hereafter.

Figure 3:
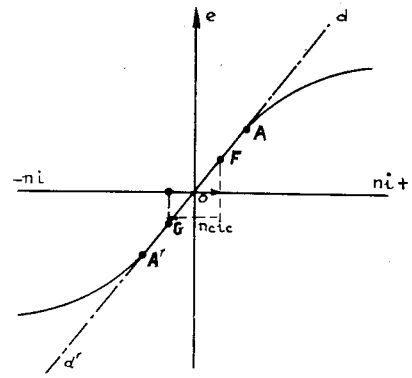

The shunt winding $a$ of the exciter E is regulated in such a way that its resistance line $d'Od$ (Fig. 3) coincides with the straight portion A'OA of the open circuit characteristic $e = f(ni)$, where $e$ is the voltage of the exciter E, and $ni$ the resultant ampere-turns of its field excitation. When the current $i_c$ in the independent field winding $c$ is nil, the voltage $e$ which the exciter E can furnish is indeterminate; the point of operation may be situated at any point whatever along the line A'OA. But on the contrary by reason of the electrical connection existing between the exciter E and the phase-shifter H, itself connected to the grids $g$ of the rectifier R, the exciter voltage $e$ must assume a definite value.

Figure 4:
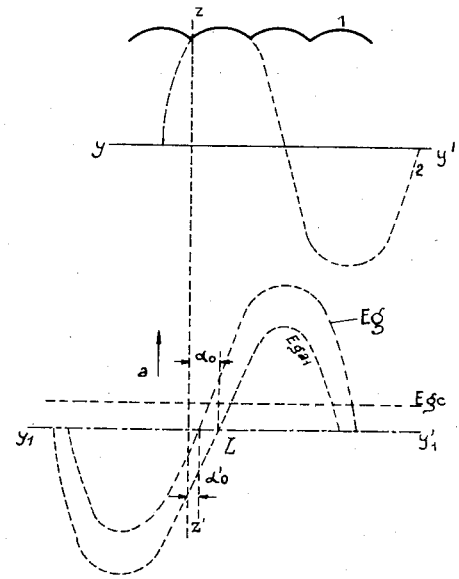

In Fig. 4, the thick-line curve 1 represents the rectified D. C. voltage $E_c$, and the dotted curve 2 the A. C. voltage of one anode, the axis of reference of these two curves being the horizontal line $y\ y'$ corresponding to the potential of the neutral point O of the transformer T (Fig. 1). In this same Fig. 4, there are represented with the axis of reference $y_1\ y'_1$ corresponding to the potential of the cathode K of the rectifier R, two voltages $Ega_1$ and $Egc$, of which $Ega_1$ is the alternating potential of the corresponding anode-control grid in relation to the potential of the cathode K, while $Egc$ is the D. C. biasing voltage component, which in the particular instance is the voltage $e$ of the exciter E. The corresponding anode ignites when the potential of its grid attains the value O, this being only approximately correct but sufficient for the present explanation. When the D. C. component $Egc = O$, the anode ignites at the point L; taking for axis of reference for the ignition angles the vertical line $z\ z'$ passing through the natural ignition point of the same anode, the ignition angle is represented by $\alpha_0$. If now the D. C. component $Egc$ be considered as having a certain value $E'gc$, qualified as positive when it tends to displace the curve $Ega_1$ bodily upwards in the direction of the arrow $a$, the resultant grid-biasing voltage $E_g$ will reduce the ignition angle to $\alpha'_0$ which is less than $\alpha_0$; in this case the rectified voltage $E_c$ will increase in value.

It will be assumed that the constant ignition angle $\alpha_0$ has a value such that when the output current $I_c$ supplied by the rectifier R is nil and the D. C. biasing voltage component $Egc = O$, the value of the rectified voltage $E_c$ shall be equal to the voltage $E_s$ of the reference machine S (Fig. 1). It can be verified that in this case the voltage $e$ of the exciter E will assume the value O when the output current $I_c = O$.

In effect, if the voltage $e$ is not equal to O, and the point of operation lies at F (Fig. 3), that is to say $e$ is greater than O, the ignition angle of the rectifier anodes will decrease, and the output voltage $E_c$ will become greater than the voltage $E_s$ of the machine S. It has been mentioned already that when $E_c$ is greater than $E_s$, a current $I_c$ will circuate in the field winding $c$ in the direction from $m$ to $l$. If the hand or direction of the winding $c$ is chosen suitably for its ampere-turns $n_c\ i_c$ to be negative with this current $i_c$ flowing from $m$ to $l$, the point of operation of the exciter E will tend to descend towards G. In reality, the voltage $e$ will not reach the point G, for when the voltage $e$ passes through zero, and $E_c$ is equal to $E_s$, the independent field current $i_c$ will become nil, and the voltage $e$ will fix itself at zero value, which will constitute a position of equilibrium. The value of the exciter voltage $e$, may oscillate slightly around the point O (Fig. 3); this depends on the value $\Delta\ (E_c - E_s)$ for which the current $i_c$ will be impelled in one direction or the other through the winding $c$. When the output current $I_c$ increases, the voltage $E_c$ will tend to diminish, but by reason of the operation described above, the voltage $E_c$ will remain constant so that $E_c = E_s$. The exciter voltage $e$ will tend to increase in positive value, in such a way as to diminish the ignition angle of the rectifier anodes.

This arrangement shows that the use of the exciter E provides characteristics of a novel kind; the independent field winding $c$ of this exciter receives current impulses of constant intensity, the duration and the direction of these impulses being such that the exciter voltage $e$ can take the values necessary for ensuring the desired regulation. This mode of operation is very valuable, because the intensity of the impulse is independent of the variations of the controlled voltage or other quantity, and in case of small variations of the latter it allows for obtaining regulation without delay. Moreover by choosing for the independent field current $i_c$ a sufficiently high value, the regulation of the exciter voltage $e$ becomes independent of the magnetic inertia of the exciter E itself.

The bridge system producing the impulses of current $i_c$ being constituted by discharge tubes acts likewise without delay. It is evident that there can be employed any other suitable system for setting up the current impulses in the field winding $c$ of the exciter E, for example by means of an oscillating regulator of the Tirill type, the operation of the device as a whole remaining the same.

In the description given with reference to Figs. 1 to 4, the voltage Es of a generator or reference machine S has been utilized as reference quantity, it being assumed that this voltage Es is constant. By the addition of a supplementary field winding upon the generator S, this winding being traversed by a current proportional to the rectifier output current Ic, it is possible to obtain over-compounding or under-compounding of the rectifier characteristic under load, with $Ec = f(Ic)$.

Figure 5:
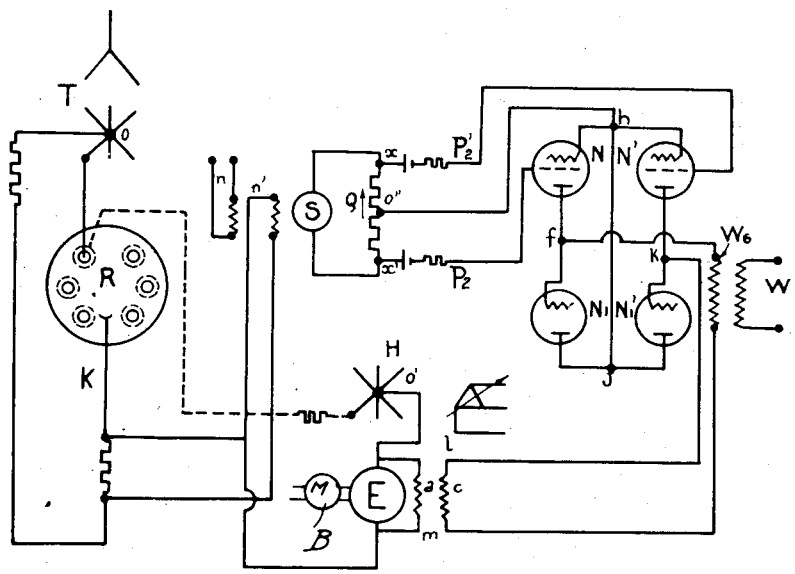
Fig. 5 represents another example of an arrangement for carrying out the invention.

Another application may be considered, viz. to maintain the D. C. output current constant when the power supplied varies. Fig. 5 represents an arrangement for obtaining this result; there will be found therein the same elements as in Fig. 1, except for the system of control by the impulses of current $i_c$.

The generator or reference machine S driven at constant speed is provided with two field windings wound in opposition, the one winding $n$ is traversed by a constant current $i_n$, the other $n'$ is traversed by a current proportional to the output current Ic supplied by the rectifier R. The generator S can deliver current to a resistance Q of which the middle point O″ is connected to the point $h$ of the bridge N N′ N₁ N′₁. The two extremities $x'$ and $x$ of the resistance Q, are connected respectively to the grids of the tubes N and N′. The sources of continuous current P₂ P′₂ constitute a constant negative polarization of the grids N and N′, so long as the generator S sends no current through the resistance. The operation of the system will be readily understood. When the two windings $n$ $n'$ are in balance, that is when the condition $i_n = i_{n'}$ is fulfilled, no current circulates in the field winding $c$ of the exciter E. If $i_{n'}$ becomes greater then $i_n$ a current circulates in the resistance Q, which current will be assumed to flow in the direction from $x'$ towards $x$. The tube N will discharge, causing an impulse of current in the field winding $c$ of the exciter E. If this winding $c$ is suitably wound, there will result a decrease of the exciter voltage $e$ and therefore a decrease of the rectifier voltage Ec, until the condition $i_n = i_{n'}$ shall be again fulfilled. If the current $i_{n'}$ decreases, there will be produced in inverse operation until the condition $i_n = i_{n'}$ shall be fulfilled once more.

The arrangement shown in Fig. 5 can be employed in the parallel working of the rectifier R with any D. C. machine (mechanical rectifier or rotary converter) in order to ensure the suitable distribution of the loads. It suffices to feed the field winding $n$ of the generator S with a current proportional to the output current supplied by the machine coupled in parallel with the rectifier R.

The control of the grids of the tubes N and N′ may be effected by other systems including a suitable reference quantity, for example voltmeters with contacts, electromagnetic balances, or regulators with oscillating contacts, for ensuring the same regulations as mentioned above. The choice of a control device for the impulses of current $i_c$ in the field winding $c$ of the exciter E will depend upon the degree of precision which it is desired to obtain.

It is possible to contemplate likewise arrangements without thermionic tubes, the impulse current being sent direct into the field winding $c$ of the exciter E, for example by an electromagnetic balance with suitable contacts.

It is evident that without departing from the scope of the invention, the exciter E may be provided with two field windings analogous with the winding $c$, the one winding being utilized for an impulse of a given direction and the other for an impulse of opposite direction.

In conclusion, the conjugate use of an exciter having two field windings and a device adapted to send current impulses of variable direction into one of the field windings allows of realizing the automatic and rapid regulation of an ionized vapor discharge rectifier provided with anode-control grids. The control of the device giving the impulses of current for the exciter field can be realized as a function of various quantities, either the D. C. output voltage of the rectifier, the D. C. current supplied or the current supplied by another machine. This means of control can be obtained with very diverse apparatus, but in all cases presenting a suitable reference quantity, which may be the D. C. voltage furnished by an electrical reference machine of small power, as in the arrangements described, or even by gravity or the strength of a spring, as in the electromagnetic balances and oscillating regulators mentioned.

What I claim is:—

1. In the art of grid-controlled vapor electric discharge devices employed as recifiers for polyphase alternating current, means for regulating the moment of ignition of the anodes by variation of a D. C. component superposed on the A. C. grid-biassing potential, comprising an exciter supplying said D. C. component, a shunt field winding for said exciter, an independent field winding for said exciter, means for energizing said independent field winding by current variable in direction, and means for controlling said energizing means in relation to a reference quantity.

2. In the art of grid-controlled vapor electric discharge devices employed as rectifiers for polyphase alternating current, means for regulating the moment of ignition of the anodes by variation of a D. C. component superposed on the A. C. grid-biassing potential, comprising an exciter supplying said D. C. component, a shunt field winding for said exciter, an independent field winding for said exciter, means for energizing said independent field winding by current impulses variable in direction but of substantially constant maximum intensity, and means for controlling said energizing means in relation to a reference quantity.

3. In the art of grid-controlled vapor electric discharge devices employed as rectifiers for polyphase alternating current, means for regulating the moment of ignition of the anodes by variation of a D. C. component superposed on the A. C. grid-biassing potential, comprising an exciter supplying said D. C. component, a shunt field winding for said exciter, an independent field winding for said exciter, means for energizing said independent field winding by current impulses variable in direction, and means for maintaining said current impulses until the output of said rectifier is matched with a reference quantity.

4. In the art of grid-controlled vapor electric discharge devices employed as rectifiers for polyphase alternating current, means for regulating the moment of ignition of the anodes by variation of a D. C. component superposed on the A. C. grid-biassing potential, comprising an exciter supplying said D. C. component, a shunt field winding for said exciter, an independent field winding for said exciter, means for energizing said independent field winding by current variable in direction, a reference machine providing a standard for the regulation of said rectifier, and means for controlling said energizing means by the relation between said standard and the output of said rectifier.

5. In the art of grid-controlled vapor electric discharge devices employed as rectifiers for polyphase alternating current, means for regulating the moment of ignition of the anodes by variation of a D. C. component superposed on the A. C. grid-biassing potential, comprising an exciter supplying said D. C. component, a shunt field winding for said exciter, an independent field winding for said exciter, means for energizing said independent field winding by current impulses variable in direction, said energizing means including four thermionic tubes arranged as a bridge, two of said tubes having control grids, a source of alternating current feeding said independent field winding through opposite points in said bridge, means for applying potential between the control grids of said two grid-provided tubes, and means for varying said potential by application of a reference potential, said current impulses varying in direction with the alternative discharge of said two grid-provided tubes.

6. In the art of grid-controlled vapor electric discharge devices employed as rectifiers for polyphase alternating current, means for regulating the moment of ignition of the anodes by variation of a D. C. component superposed on the A. C. grid-biassing potential, comprising an exciter supplying said D. C. component, a shunt field winding for said exciter, said shunt field winding being adjusted to have its resistance line coincident with the straight portion of the voltage characteristic of said exciter, an independent field winding for said exciter, means for energizing said independent field winding by current variable in direction, and means for controlling said energizing means in relation to a reference quantity.

LOUIS LEROY.